UNITED STATES PATENT OFFICE.

GEORGE F. WILSON AND GEORGE PAYNE, OF BELMONT VAUXHALL, ENGLAND.

IMPROVEMENT IN SAPONIFYING FATS.

Specification forming part of Letters Patent No. 15,158, dated June 17, 1856.

*To all whom it may concern:*

Be it known that we, GEORGE FERGUSSON WILSON, of Belmont Vauxhall, in the county of Surrey, England, managing director of Prices' Patent Candle company, and GEORGE PAYNE, of the same place, subjects of the Queen of Great Britain, have invented or discovered certain new and useful Improvements in Distilling Fatty and Oily Matters; and we, the said GEORGE FERGUSSON WILSON and GEORGE PAYNE, do hereby declare the nature of the said invention, and the manner in which the same is to performed, are fully described and ascertained in and by the following statement thereof—that is to say:

In distilling fatty and oily matters it has heretofore been usual to previously acidify them by means of lime or direct sulphuric acid saponification, and then to distill in steam introduced in its ordinary or superheated state, and it has been proposed to distill neutral fats or oils in steam introduced in its ordinary or superheated state. In these cases the distillation has heretofore been conducted at so high a temperature as to leave the glycerine with part of the fatty matter as a residuum in the still, or to cause the evolution of acroline, the effect of which last is, besides the loss of glycerine, to taint the fat acid products of distillation. Now, we have discovered that neutral or partially neutral oily and fatty matters may be so distilled by heat, when steam or vapor of water is mixed and distributed among them, as to cause the base to distill in the state of glycerine along with the fat acids, but uncombined with them; and our invention consists in a mode or process of so distilling oily and fatty matters that their base may distill over in the state of glycerine along but not in combination with the acids, and thus wasteful residuum may be avoided or diminished. For this purpose the charge in the still, the temperature, and the supply of steam or vapor of water are so regulated as to develop the base in such a state as enables it to distill over with the acids in the form of glycerine, and for most fats and oils we have found that a temperature of from about 550° to 600° Fahrenheit is suitable.

Having thus stated the nature of our invention, we will now proceed to describe the manner of performing the same.

In carrying out this invention we employ an ordinary still and condensing or refrigerating apparatus, preferring one with an ample refrigerating surface, such as are now resorted to and well understood for distilling saponified fatty matters when using heated steam, with a view to exclude the atmospheric air, and also in order that such steam may act as a carrier to carry over the fatty vapors. The bottom of the still is heated by a fire provided with a damper to the flue or chimney, that the heat of the matters under process may be kept from getting up to a degree beyond the desired temperature. We, however, make no claim to such still and apparatus, nor is it necessary to describe them here, the same not being new. The stills and condensing apparatus used for the purpose may be varied, so long as they will admit of carrying on our invention, which, as before stated, consists of a process of distilling over glycerine, together with the fat acids from neutral or partially neutral fats, the glycerine and fat acids being mixed, but uncombined, so that they will separate when allowed to stand, by which process the fat acids will be very pure, and the glycerine will also be very pure, but dissolved in the water resulting from the condensation of the steam passing off with the vapors of the glycerine and of the fat acids.

In charging a still a quantity of neutral or partially neutral fats is introduced into the heated still and heated steam is introduced, as heretofore when distilling saponified fats or oils in an atmosphere of heated steam, it being preferred that the heated steam should be passed below the fats or oils, and rise up through them in numerous streams, care being taken that the temperature of the matters in the still shall not come up to the temperature which will decompose the glycerine in the fatty or oily matters. A thermometer is used in the still to indicate the temperature of the contents of the still, and we have found in all cases that it is desirable with neutral fats and oils to keep the heat below 600° of Fahrenheit and above 550° of Fahrenheit, as by such means we have not found that the glycerine has been decomposed in any instance. On the contrary, the glycerine has come over pure. We have also found that when the fats or oils are only partially neutral, which is very commonly the case with palm-oil, while there are fat acids in the still, the draft of the fires may be quickened and the process hastened; but as soon as the fat acids which were in the still have passed over, if the temperature is materially above 600° Fahrenheit, acroleine will probably be formed, particularly if steam be not freely supplied, and the production of acroleine is quickly indicated by the pungent smell, and by the action it has on the eyes of persons near the condenser, from which the distilled products constantly flow.

Although we recommend that the temperature, as a general rule, should be kept below 600° Fahrenheit, we have worked off charges at higher temperatures, keeping up a very plentiful supply of steam, and have not decomposed the glycerine, still we have obtained no superior result, while there was a greater hazard of decomposing the glycerine; and therefore we believe it most convenient to retain the contents of the still rather under than above 600° Fahrenheit (keeping up a free supply of steam) during the whole process, whether the fats or oils be neutral or partially neutral, and we may state that a workman with very moderate care will continue to heat the steam and keep up a free supply thereof to the interior of the still, and he may also maintain the fire under the still in such manner as to retain the temperature about 600°.

We would state in respect to the use of fire or other external means of heating a still that it is desirable that the external heat immediately under the still should be very moderate, and that the heated steam admitted into the still should by preference be depended on for maintaining the higher temperature.

We would remark that different neutral fatty and oily substances appear to vary in some degree, but not to a large extent in regard to the temperature at which they may be distilled most quickly in an atmosphere of steam or vapor of water and yet not decompose the glycerine. A workman, however, with attention, when acting on the first charge of a neutral oil or fat with which he has not before operated, will, by raising the temperature gradually, and noticing at what temperature the matters come over most freely, and yet avoid the production of acroleine, ascertain at what temperature the particular fat or oil may be distilled most favorably, and then in distilling subsequent charges of the same fat or oil he will retain the contents of the still as near as may be at the ascertained most favorable temperature—that is, at a temperature which will bring over the products most quickly without allowing the heat to rise so high as to produce acroleine.

When using a still with a refrigerator or condenser in compartments each more and more distant from the still, and each compartment provided with a cock to draw off the distilled and condensed products, (which is the arrangement of condenser we prefer,) it is found that the products which flow from the hottest of such condensers will be for the most part free from water and glycerine, and the glycerine for the most part will be found to come off with the products which condense in the compartment of the condenser most distant from the still and where the condenser is kept lower in temperature, and in all the receivers the fat acids will quickly separate from the glycerine and water when allowed to stand and cool for a short time.

It may be proper to state that the compartment of the condenser most distant from the still is open to the atmosphere, no pressure being necessary internally of the still and condenser.

When the glycerine is desired to be in a more concentrated state than it is when it comes over and is condensed, it may have the water more or less separated, which may be conveniently done by being evaporated therefrom, and thus will be obtained distilled and pure glycerine as well as fat acids.

We are aware that for the purpose of separating fat acids and glycerine from oily and fatty bodies the oils or fats have been mixed with water or made into an emulsion and next subjected in a closed vessel or tube to heat, and an artificial pressure produced by a force-pump, and to such extent as to entirely prevent the accumulation of steam in the vessel or tube, the essential features of such process being the employment of heat and artificial pressure in a manner to entirely prevent the formation or use of steam or vapor. Now, although by our process we produce results in many respects similar to those of the heat and pressure process above referred to, our method of heating the fatty or oily bodies so as to distill over the glycerine and fat acids, as described, differs, essentially, from such, and, besides, is far more economical and advantageous. We do employ steam at or about at a certain temperature, and we do not employ artificial pressure or such as is produced by a forcing pump or apparatus, our process preventing the formation of acroleine. The outer end of the refrigerator is open to the atmosphere, so that there is no restriction whatever between the interior of the still and the outer atmosphere. The steam flows from the boiler through the ordinary heating apparatus, is raised to the required high degree of heat as previously practiced in distilling fats, the heated or surcharged steam passes in divided streams through and among the fat in the still, and rises together with the vapors of the fat acid and glycerine, and the whole passes over into the condenser without pressure, where the condensation takes place also without pressure, and the uncondensed vapor, if any, passes into the atmosphere. Therefore there is no pressure in or danger of bursting the apparatus which is used. An important result attained by our process is that the glycerine produced is distilled glycerine—a product never before obtained, and is one of the utmost importance, and is already leading to great consequences in the arts and manufactures. Again, the fat acids obtained are distilled fat acids which are highly pure, so that by one distilling process the base of the fats—viz., glycerine—is obtained distilled and highly pure, and such is also the case in respect to the fat acids. Now, in Tilghman's process, which consists in heating the oils or neutral fats by heat and artificial pressure, so as to prevent the formation of steam or vapor, neither the glycerine nor the fat acid is so pure or is distilled. On the contrary, they are both impure, and if the pure fat acids, known as "distilled" fat acids, be required for candle-making or otherwise, Tilghman's impure product must be distilled after he has obtained it separate from the glycerine, which greatly increases the expense and time occupied.

We are aware that oils and fats have been treated with steam, and that it has been used as a carrier in the still; but they have not been treated in accordance with our process—viz., by steam maintained at about 550° to 600° temperature, above specified, and so as to produce results attained by it. We therefore lay no claim to the processes above mentioned of treating oils or neutral fats by heat and artificial pressure, so as to prevent the formation and use of steam or vapor; nor do we claim the common method of treating them by steam in a superheated state; but What we do claim is—

Our improved method of treating them so as to distill over glycerine with fat acids mixed, but uncombined, as hereinbefore explained.

GEO. F. WILSON.
GEORGE PAYNE.

Witnesses:
GEO. PITT,
    4 *Old Square, London.*
WILLIAM EWING,
    *No. 67 Gracechurch Street, London.*